(12) United States Patent
Davis, Jr. et al.

(10) Patent No.: US 11,042,839 B2
(45) Date of Patent: *Jun. 22, 2021

(54) EQUIPMENT MANAGEMENT SYSTEM

(71) Applicant: Prova Group, Inc., Dallas, TX (US)

(72) Inventors: Tommy Lee Davis, Jr., Florrisant, MO (US); David Earl Doser, Jr., Fenton, MO (US)

(73) Assignee: PROVA GROUP, INC., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,362

(22) Filed: Nov. 17, 2020

(65) Prior Publication Data

US 2021/0073720 A1    Mar. 11, 2021

Related U.S. Application Data

(63) Continuation of application No. 16/101,010, filed on Aug. 10, 2018, now Pat. No. 10,839,344, which is a continuation of application No. 13/758,933, filed on Feb. 4, 2013, now Pat. No. 10,049,365, which is a continuation of application No. 12/950,585, filed on
(Continued)

(51) Int. Cl.
| | | |
|---|---|---|
| *G06Q 10/08* | (2012.01) | |
| *G06F 16/21* | (2019.01) | |
| *G06F 16/22* | (2019.01) | |
| *G06F 16/245* | (2019.01) | |
| *G06F 16/28* | (2019.01) | |
| *H04L 9/32* | (2006.01) | |
| *G06Q 20/32* | (2012.01) | |

(Continued)

(52) U.S. Cl.
CPC ........... *G06Q 10/087* (2013.01); *G06F 16/21* (2019.01); *G06F 16/22* (2019.01); *G06F 16/245* (2019.01); *G06F 16/285* (2019.01); *G06Q 10/0875* (2013.01); *G06Q 20/3276* (2013.01); *G06Q 30/012* (2013.01); *G06Q 30/0609* (2013.01); *H04L 9/3226* (2013.01)

(58) Field of Classification Search
CPC .... G06Q 10/087; G06Q 20/12; G06F 16/245; G08B 13/2468; G06K 7/10861
USPC ...................................................... 340/10.1
See application file for complete search history.

(56) References Cited

U.S. PATENT DOCUMENTS

| | | |
|---|---|---|
| 5,629,981 A | 5/1997 | Nerlikar |
| 6,497,656 B1 | 12/2002 | Evans et al. |

(Continued)

OTHER PUBLICATIONS

Petition for Inter Partes Review ("IPR") of U.S. Pat. No. 8,234,185 dated Jan. 22, 2021, 77 pages.
(Continued)

*Primary Examiner* — Vernal U Brown
(74) *Attorney, Agent, or Firm* — Jackson Walker LLP; Christopher J. Rourk

(57) ABSTRACT

A system and method of managing equipment whereby the system incorporates a tagging device to attach identification tags to each piece of equipment. A scanning device is used to read the identification tags and relay this information to an equipment server. An input device is used to input information to the equipment server. The equipment server runs the equipment management program. The system flags a potential asset assigned to an asset creating individual. Equipment is designated an asset after use in an asset creating event.

20 Claims, 4 Drawing Sheets

Related U.S. Application Data

Nov. 19, 2010, now Pat. No. 8,370,225, which is a continuation of application No. 11/086,943, filed on Mar. 22, 2005, now Pat. No. 7,840,453, which is a continuation of application No. 10/038,292, filed on Jan. 4, 2002, now abandoned.

(51) Int. Cl.
*G06Q 30/00* (2012.01)
*G06Q 30/06* (2012.01)

(56) References Cited

U.S. PATENT DOCUMENTS

| | | | |
|---|---|---|---|
| 6,608,911 B2 | 8/2003 | Lofgren et al. |
| 6,609,656 B1 | 8/2003 | Elledge |
| 6,612,928 B1 | 9/2003 | Bradford et al. |
| 6,709,333 B1 | 3/2004 | Bradford et al. |
| 6,738,903 B1 | 5/2004 | Haines |
| 6,809,646 B1 | 10/2004 | Lee |
| 6,842,106 B2 | 1/2005 | Hughes et al. |
| 6,857,714 B2 | 2/2005 | Hohberger et al. |
| 6,901,304 B2 | 5/2005 | Swan et al. |
| 6,902,111 B2 | 6/2005 | Han et al. |
| 6,935,560 B2 | 8/2005 | Andreasson et al. |
| 6,943,678 B2 | 9/2005 | Muirhead |
| 6,963,282 B1 | 11/2005 | Yeates et al. |
| 6,967,566 B2 | 11/2005 | Weston et al. |
| 7,004,385 B1 | 2/2006 | Douglass |
| 7,013,290 B2 | 3/2006 | Ananian |
| 7,053,771 B2 | 5/2006 | Hussmann |
| 7,069,251 B1 | 6/2006 | Bartz et al. |
| 7,070,112 B2 | 7/2006 | Beenau et al. |
| 7,072,864 B2 | 7/2006 | Brake, Jr. et al. |
| 7,093,767 B2 | 8/2006 | Faenza, Jr. et al. |
| 7,100,052 B2 | 8/2006 | Ghazarian |
| 7,113,088 B2 | 9/2006 | Frick et al. |
| 7,113,095 B2 | 9/2006 | Kuzma et al. |
| 7,119,659 B2 | 10/2006 | Bonalle et al. |
| 7,123,696 B2 | 10/2006 | Lowe |
| 7,126,470 B2 | 10/2006 | Clift et al. |
| 7,137,000 B2 | 11/2006 | Hohberger et al. |
| 7,138,915 B2 | 11/2006 | Morita et al. |
| 7,140,542 B2 | 11/2006 | Andreasson et al. |
| 7,146,112 B2 | 12/2006 | Phipps et al. |
| 7,149,503 B2 | 12/2006 | Aarnio et al. |
| 7,156,301 B1 | 1/2007 | Bonalle et al. |
| 7,170,391 B2 | 1/2007 | Lane et al. |
| 7,171,192 B2 | 1/2007 | Song et al. |
| 7,173,515 B2 | 2/2007 | Ohki et al. |
| 7,175,081 B2 | 2/2007 | Andreasson et al. |
| 7,182,256 B2 | 2/2007 | Andreasson et al. |
| 7,187,267 B2 | 3/2007 | Cole |
| 7,187,286 B2 | 3/2007 | Morris et al. |
| 7,194,438 B2 | 3/2007 | Sovio et al. |
| 7,202,789 B1 | 4/2007 | Stilp |
| 7,212,119 B2 | 5/2007 | Chipchase et al. |
| 7,213,766 B2 | 5/2007 | Ryan et al. |
| 7,221,258 B2 | 5/2007 | Lane et al. |
| 7,230,519 B2 | 6/2007 | Coughlin et al. |
| 7,230,534 B2 | 6/2007 | Elledge |
| 7,232,066 B2 | 6/2007 | Andreasson et al. |
| 7,239,226 B2 | 7/2007 | Berardi et al. |
| 7,239,242 B2 | 7/2007 | Ghosh |
| 7,246,744 B2 | 7/2007 | O'Brien et al. |
| 7,246,748 B1 | 7/2007 | Feuerman et al. |
| 7,249,112 B2 | 7/2007 | Berardi et al. |
| 7,252,230 B1 | 8/2007 | Sheikh et al. |
| 7,253,735 B2 | 8/2007 | Gengel et al. |
| 7,258,276 B2 | 8/2007 | Linton et al. |
| 7,259,679 B2 | 8/2007 | Yoshida et al. |
| 7,269,361 B2 | 9/2007 | Huss et al. |
| 7,273,181 B2 | 9/2007 | White |
| 7,276,388 B2 | 10/2007 | Arneson et al. |
| 7,278,572 B2 | 10/2007 | Kim et al. |
| 7,281,657 B2 | 10/2007 | Patel et al. |
| 7,283,048 B2 | 10/2007 | Stilp |
| 7,284,692 B1 | 10/2007 | Douglass |
| 7,293,705 B2 | 11/2007 | Linton et al. |
| 10,049,365 B2 * | 8/2018 | Davis, Jr. ............... G06F 16/22 |
| 10,839,344 B2 * | 11/2020 | Davis, Jr. ............... G06F 16/21 |

OTHER PUBLICATIONS

IPR Exhibit TRSA 1001—U.S. Pat. No. 8,234,185 (Issued Jul. 31, 2012—Davis), 15 pages.
IPR Exhibit TRSA 1002—U.S. Pat. No. 8,234,185, 281 pages.
IPR Exhibit TRSA 1003—Declaration of Anthony J. Wechselberger, dated Jan. 20, 2021, 101 pages.
IPR Exhibit TRSA 1004—CV of Anthony J. Wechselberger, 10 pages.
IPR Exhibit TRSA 1005—U.S. Patent Publication No. 2004/0140349—Shaw, dated Jul. 22, 2004, 15 pages.
IPR Exhibit TRSA 1006—U.S. Patent Publication No. 2004/0093497—Arangio, dated May 13, 2004, 16 pages.
IPR Exhibit TRSA 1007—U.S. Pat. No. 6,681,990—Vogler, et al., dated Jan. 27, 2004, 11 pages.
IPR Exhibit TRSA 1008—U.S. Patent Publication No. 2003/0046543—Houston et al., dated Mar. 6, 2003, 23 pages.
IPR Exhibit TRSA 1009—U.S. Patent Publication No. 2003/0220885—Lucarelli et al., dated Nov. 27, 2003, 33 pages.
IPR Exhibit TRSA 1010—U.S. Appl. No. 10/038,292, filed Jan. 4, 2002, 24 pages.
IPR Exhibit TRSA 1011—U.S. Appl. No. 10/038,292, 389 pages.
IPR Exhibit TRSA 1012—Redline Comparison of U.S. Pat. No. 8,234,185 and U.S. Appl. No. 10/038,292, 34 pages.
IPR Exhibit TRSA 1013—Prova Group, Inc v The Roscoe Company 1:19-cv-06971 (Lex Machina), 2 pages.
IPR Exhibit TRSA 1014—Poser, "The Stock Exchanges of the United States and Europe: Automation, Globalization, and Consolidation", Published by Penn Law: Legal Scholarship Repository, 2014, 44 pages.
IPR Exhibit TRSA 1015—Oct. 1990 Issue of "IL Magazine", 14 pages.
IPR Exhibit TRSA 1016—Nov. 1994 Issue of "IL Magazine", 6 pages.
IPR Exhibit TRSA 1017—Aug. 1995 Issue of "IL Magazine", 7 pages.
IPR Exhibit TRSA 1018—U.S. Pat. No. 6,735,324—McKinley, et al., dated May 11, 2004, 7 pages.
Notice of Filing Date Accorded to Petition and Time for Filing Patent Owner Preliminary Response, mailed Feb. 16, 2021 from the USPTO—Patent Trial and Appeal Board assigning Case No. IPR2021-00382, 5 pages.

* cited by examiner

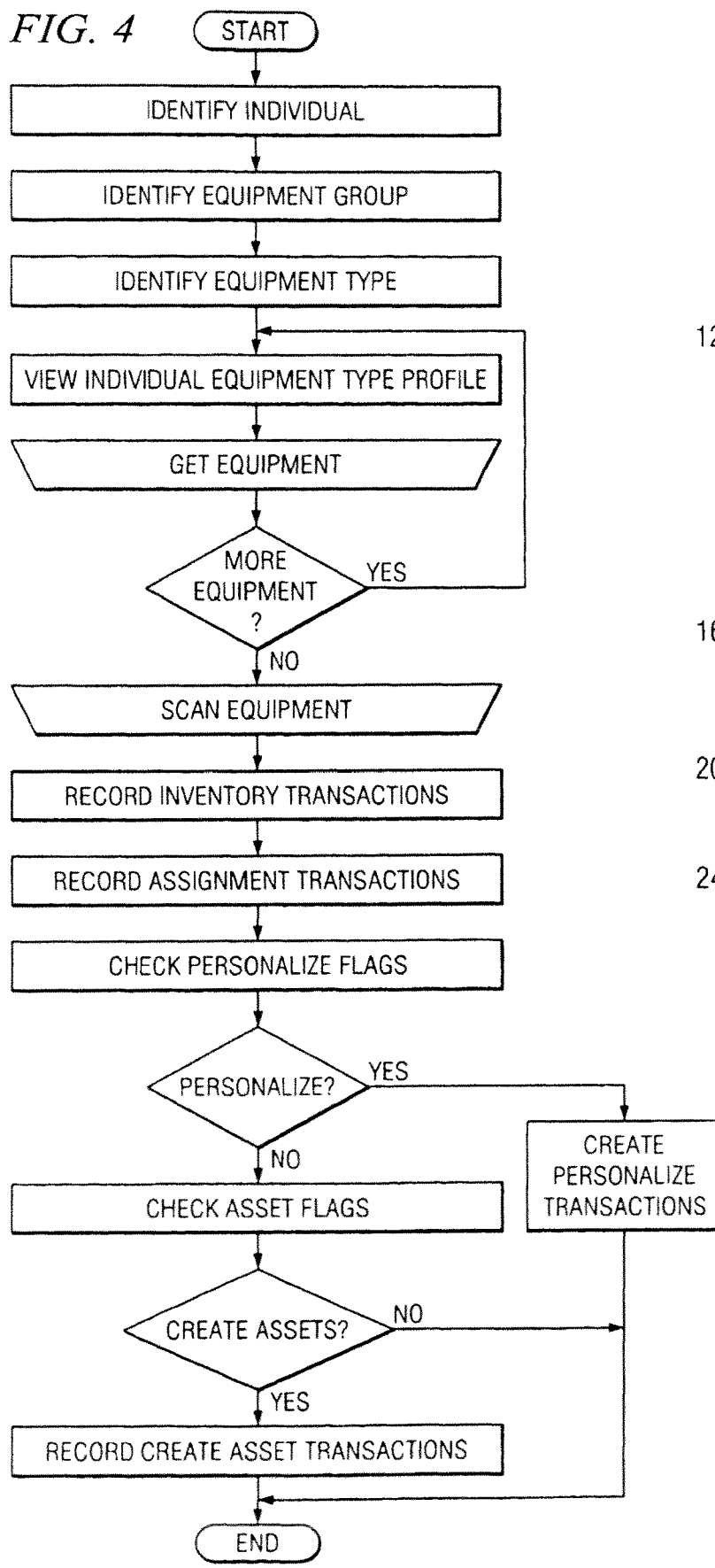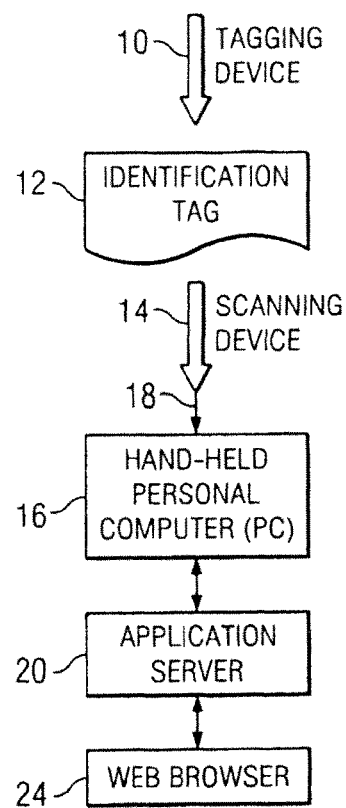

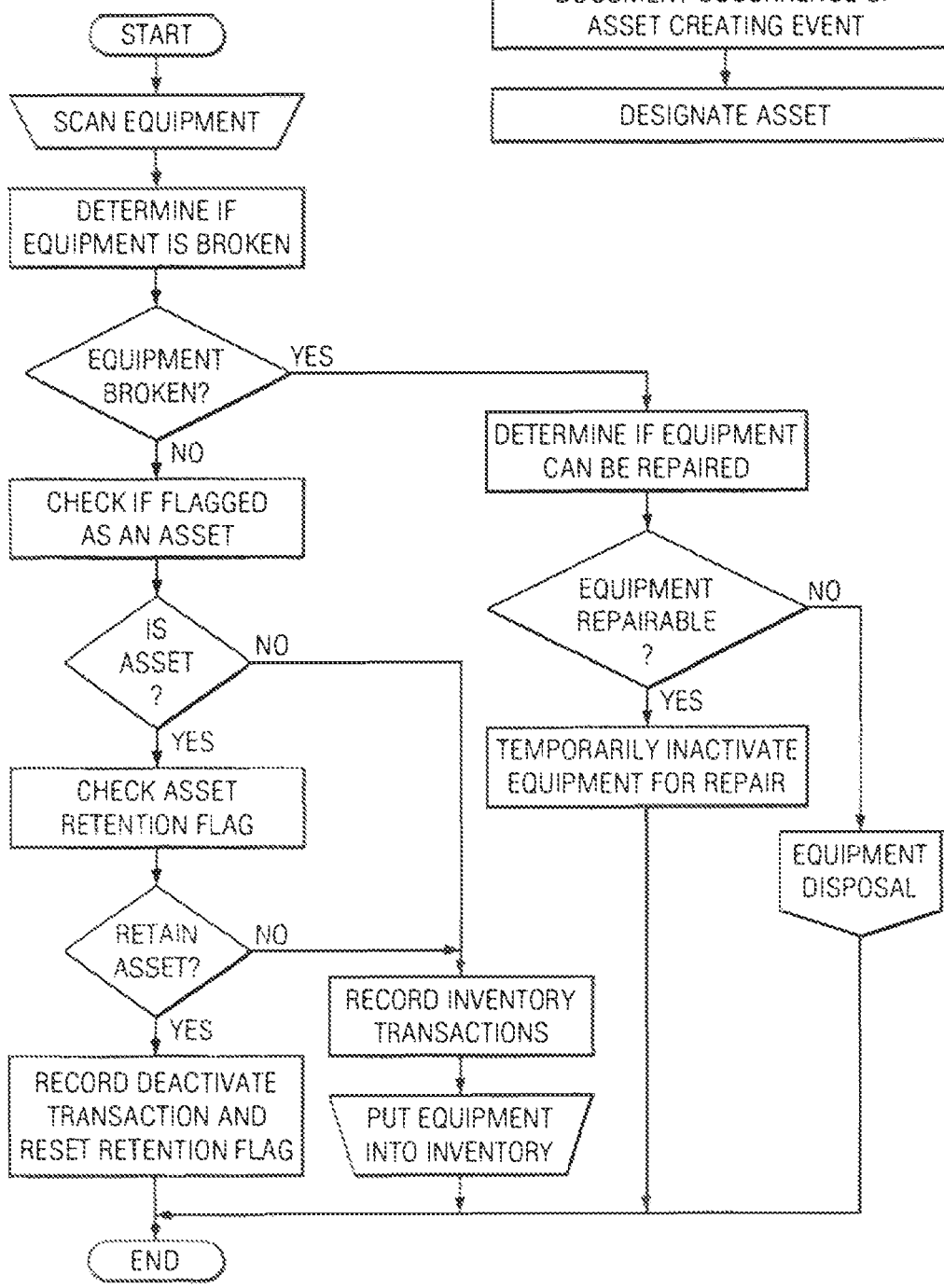

EQUIPMENT MANAGEMENT SYSTEM

CROSS-REFERENCE TO RELATED APPLICATIONS

This application is a continuation application of U.S. patent application Ser. No. 16/101,010, filed Aug. 10, 2018, now U.S. Pat. No. 10,839,344, issued Nov. 17, 2020, which is a continuation application of U.S. patent application Ser. No. 13/758,933, filed Feb. 4, 2013, now U.S. Pat. No. 10,049,365, issued Aug. 14, 2018, which is a continuation application of U.S. patent application Ser. No. 12/950,585, filed Nov. 19, 2010, now U.S. Pat. No. 8,370,225, issued Feb. 5, 2013, which is a continuation application of U.S. patent application Ser. No. 11/086,943, filed Mar. 22, 2005, now U.S. Pat. No. 7,840,453, issued Nov. 23, 2010, entitled "EQUIPMENT MANAGEMENT SYSTEM," which is a continuation application of U.S. Ser. No. 10/038,292, filed Jan. 4, 2002, now abandoned, each of which are hereby incorporated by reference for all purposes. This application is also related to U.S. Pat. No. 8,234,185, issued Jul. 31, 2012, U.S. Pat. No. 8,898,077, issued Nov. 25, 2014, U.S. Pat. No. 9,082,124, issued Jul. 14, 2015, and U.S. Pat. No. 10,229,384, issued Mar. 12, 2019, entitled "SYSTEM AND METHOD FOR TRACKING AUTHENTICATED ITEMS."

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to a system for the management of equipment, and particularly to the management of sports equipment. The invention identifies inventory, tracks inventory during the conversion from its status from inventory to valued asset, and provides a provenance for items of sports memorabilia.

Tracing its origins to the trading cards children would collect and trade of their favorite professional athletes, the sports memorabilia market is now a huge industry. Sports enthusiasts will pay large sums of money for items associated with their favorite teams and players. A visit to any professional sporting venue reveals stores selling replica jerseys. Labels sewn into the jerseys stating "Official" or "Authentic" are intended to convince the purchaser that the item is identical to the one worn by their favorite player. Even more valuable to a collector is an item actually worn or used in a game. Collectors today will pay much more for a jersey or other piece of equipment used in a game.

As in the antique industry, with sports memorabilia, the history of an item is important when calculating value. For example, a civil war era pistol is a valuable item to a collector. A civil war era pistol owned by U.S. Grant or Robert E. Lee would be worth considerably more. An item separate from such a pistol that establishes a history of ownership is called provenance. In the sports memorabilia industry provenance can enhance the value of an item. For example, if a player sets a record in a game, the jersey he wears while breaking that record will be valuable. After the game, some person must take possession of the jersey and deliver it to a prospective buyer with some assurance that the jersey is the one worn in the game. Because of the potential money at stake, there is incentive for dishonesty.

One of the main concerns for this industry is authenticity. A common method of authentication is to have the athlete sign an item for sale. According to information on the Federal Bureau of Investigation (FBI) website more than fifty percent of autographed memorabilia may be forged. The forged items are often provided with forged certificates of authenticity and photographs of the athlete signing a similar item. Unfortunately, unless the collector receives the item directly from the athlete there is often no way of being sure of authenticity.

A professional sports team is operated as a business. Identifying and exploiting new revenue sources is critical to success. It is also important to minimize expenses.

There is a need for a system which can account for every piece of equipment owned by a team and the use of that equipment. U.S. Pat. No. 6,195,006 (herein incorporated by reference) to Bowers et al. discloses an inventory system using RFID tags. This system can account for every piece of inventory and provide circulation status. U.S. Pat. No. 5,796,351 (herein incorporated by reference) to Yabuki discloses a system for providing information about exhibition objects. These systems could be adapted for use with the equipment used by a sports team but neither of these systems would be able to identify a piece of sports memorabilia and provide a record of its use in a game. There is a need for a system which can identify a piece of equipment used in a game which can subsequently be sold as a piece of sports memorabilia. There is a further need for a system which can provide the provenance of an item of sports memorabilia. The provenance provides a history of the item as well as authentication. This invention fills these needs.

BRIEF SUMMARY OF THE INVENTION

The invention is a system and method of managing equipment. The invention identifies inventory, tracks inventory outflows and inflows, and manages inventory during the conversion from its status from inventory to valued asset to establish the provenance of the piece of equipment. The system incorporates a tagging device to attach identification tags to each piece of equipment. A reading device such as a scanner, is used to read the identification tags and this information is ultimately relayed to an equipment server. An input device (which could be the reading device) is used to input information to the equipment server. The equipment server runs the equipment management program.

In use, the system first receives equipment into inventory. The equipment is then identified by group and type. Equipment groups are user defined labels (e.g. game jerseys, boxing gloves, shorts). Equipment types have any number of fixed (e.g. catalog item number) and optional properties (e.g. size). The collection of all of the equipment is the inventory.

If not already present, an identification tag is affixed to each piece of equipment. Each identification tag is then scanned. The scanned value is then assigned an equipment group and equipment type. These values are sent to the equipment server and stored in an inventory database. This process is repeated for each piece of equipment.

Next the equipment is issued to an individual. Each piece of equipment is scanned, or identified as it is issued to an individual. Using the input device, the individual's profile is accessed and the piece of equipment is registered to that individual. A time and date stamp is included.

Finally, the equipment is returned. Each piece of equipment is scanned as it is returned. Using the input device, the piece of equipment is indicated as returned and whether the equipment was used in a value-enhancing event.

The equipment management program may indicate whether the piece of equipment has been transformed into a valued asset, or whether the piece of equipment should be returned to inventory to be reassigned later.

BRIEF DESCRIPTION OF THE SEVERAL VIEWS OF THE DRAWINGS

The accompanying drawings, which are incorporated in and form a part of the specification, illustrate the embodiments of the present invention and together with the description, serve to explain the principles of the invention. In the drawings:

FIG. 2 is a diagram of the application server;
FIG. 4 is a flowchart of the equipment issue step;
FIG. 5 is a flowchart of the equipment return step;
and
FIG. 6 is a flowchart of the improved method of equipment management.

DETAILED DESCRIPTION OF THE INVENTION

Figure 1:
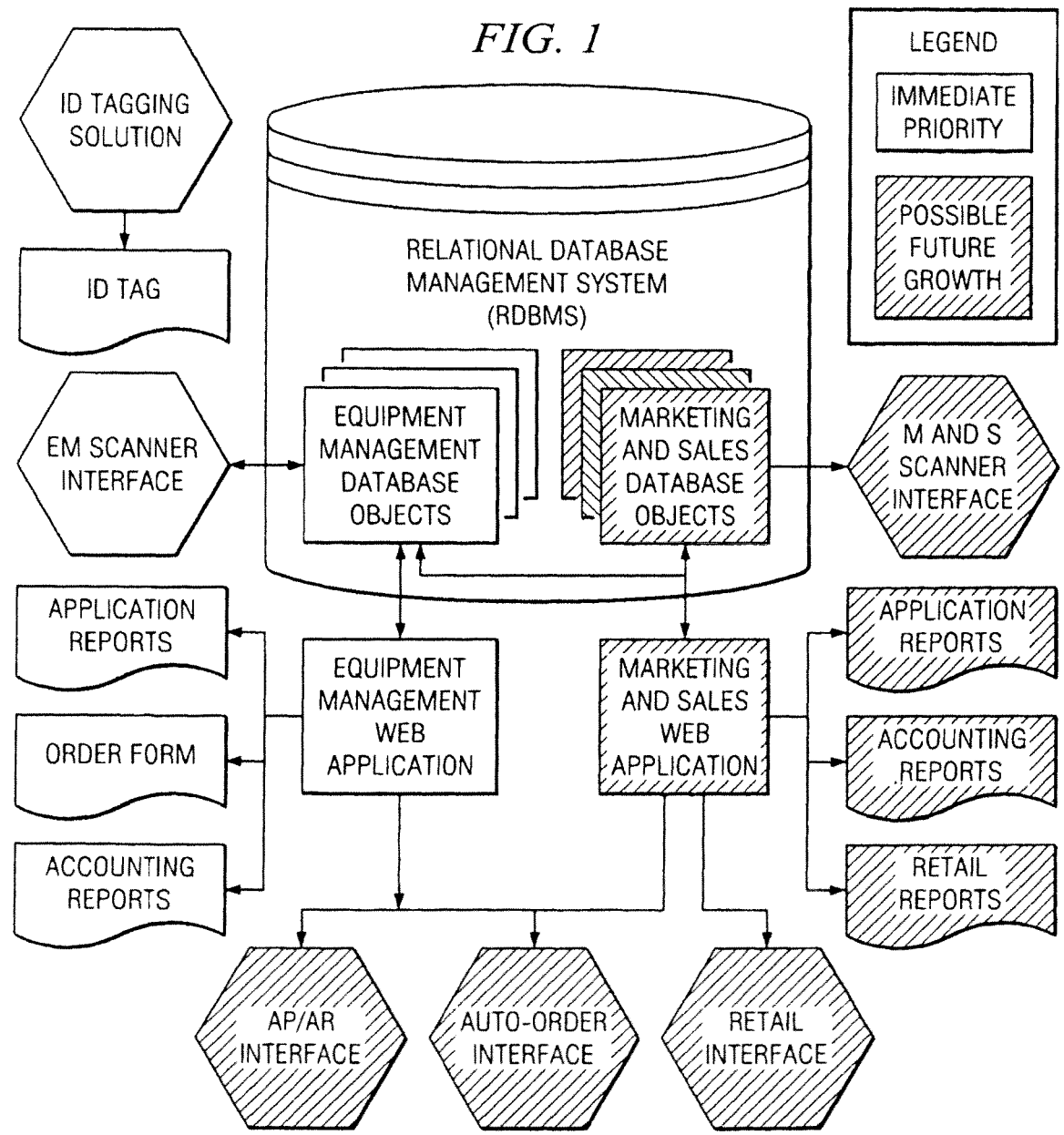
FIG. 1 is a diagram of the system architecture.

The physical components of the system can be seen in FIG. 1. A tagging device 10 is used to attach an identification tag 12 to a piece of equipment. The identification tag 12 can be any portable unique identifier. In the preferred embodiment, identification tag 12 is a barcode. However, it should be understood that any suitable identifier may be used, so long as the piece of equipment is uniquely identified. Thus, the unique identification tag 12 may take the form of a radio frequency (RF) tag, a magnetic strip tag, an electronically operated tag, or a biological tag.

Scanning device 14 is used to read the identification tag 12. The scanning device 14 can be any type of scanning device, but in the preferred embodiment the scanning device 14 is a barcode reader. The invention will also work with a bulk type scanner capable of scanning many pieces of equipment simultaneously.

The scanning device 14 is in communication with a handheld personal computer (PC) 16. The PC 16 is connected to the scanning device 14 by any acceptable means, but in the preferred embodiment a radio frequency switch 18 is used. The scanning device 14 can also be connected by a hard-wired attachment such as a serial cable or USB cable, or by a wireless device such as by infrared communication. The scanning device 14 can also be integrated directly into the PC 16.

In the preferred embodiment, the PC 16 is connected to an application server 20 by a hard-wired (serial or USB cable) attachment through a cradle 22. Any other suitable attachment means can be used including RF and IR connections. The application server 20 interacts with a web browser 24 allowing remote access.

The scanning device 14 and the PC 16 can be operated using any suitable operating system, but in the preferred embodiment MICROSOFT WINDOWS CE is used. The application server and web browser can use any suitable program but in the preferred embodiment MICROSOFT WINDOWS NT AND INTERNET EXPLORER are used, respectively. The equipment management program runs on the application server 20 and can be any inventory management program capable of being customized.

The equipment management program is used to organize and store information. Information is stored in equipment management databases. The information in the databases is used by an application server to generate different reports.

The program stores information in two types of databases. The first database is the equipment database. The second database is the individual database. The equipment database stores information for each piece of equipment. The first component of information is an identification code. This information corresponds to the portable unique identifier located on the piece of equipment. The next component is an asset flag that can be turned on and off. A status component is either activated or deactivated. Equipment group is a user-defined label. For example an equipment group can be designated "Practice Jersey", "Indoor Shoes", "Boxing Gloves", "Helmet", "Home Game Jersey", "Soccer Shorts", "Baseball Bat", etc. Equipment type consists of any number of fixed and optional properties. Fixed properties can be information such as the catalog number. Optional properties include items such as size or sleeve length. Also included in the equipment database is assignment information.

The individual database has information on each individual in the system. This information includes identification of the individual, asset creation status, equipment preferences, and equipment assignments.

Figure 3:
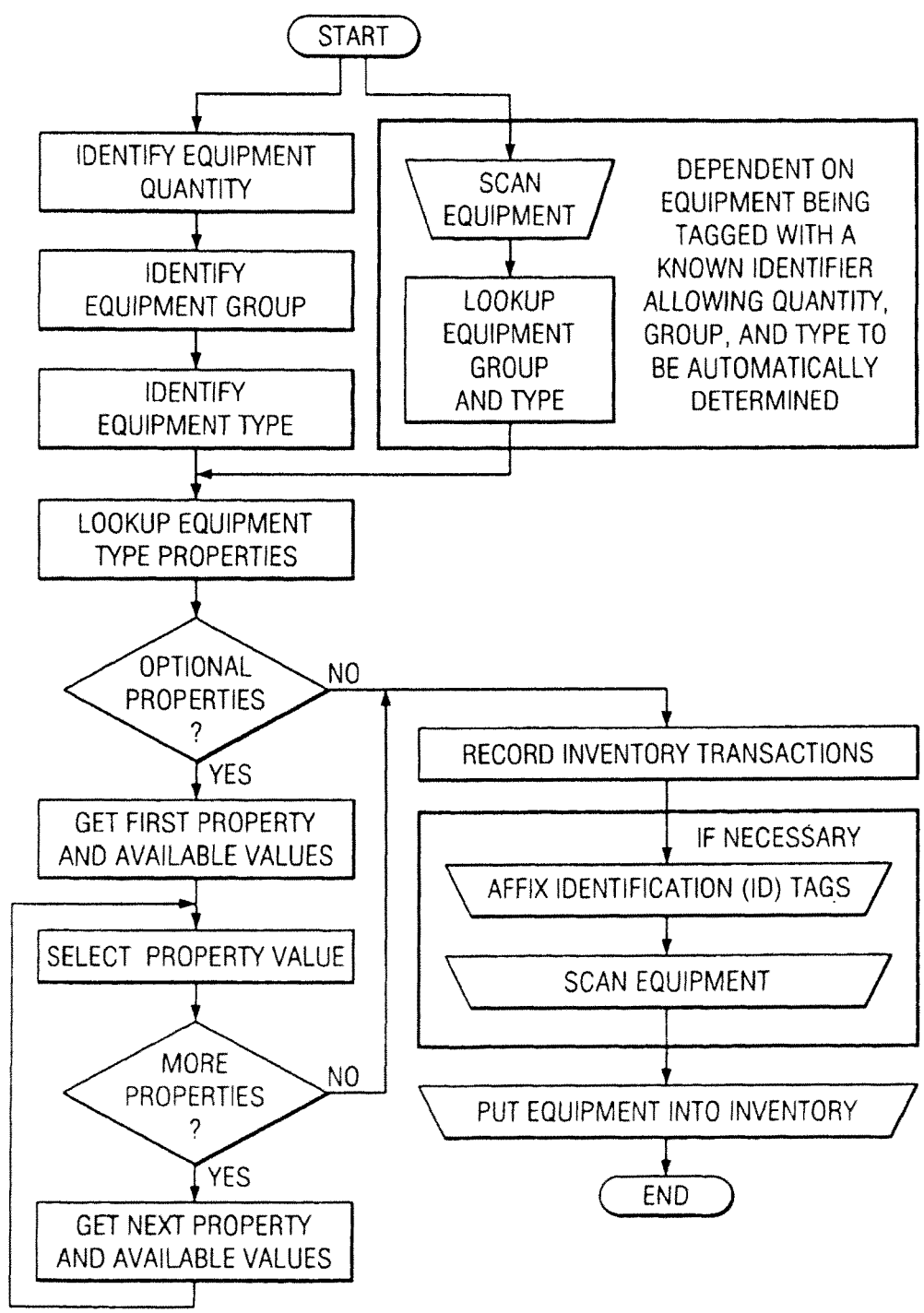
FIG. 3 is a flowchart of the equipment reception step.

The system is used to manage equipment and identify assets. Referring to FIG. 3, it can be seen how the system is used. To start using the system, every current piece of equipment and every incoming piece of equipment must be examined for a portable unique identifier tag 12. It should be noted that the term "tag" does not require a certain geometrical shape, and specifically, does not require a rectangular shape. After affixing a portable unique identifier tag 12 to the equipment where missing, the information on the equipment and unique identifier tag 12 is entered into the system. This is done by reading the portable unique identifier tag 12 with the scanning device 14. The equipment group, equipment type and any optional properties are then associated with the piece of equipment. This is repeated until each piece of all equipment with unique identifier tag 12 is entered into the system's first database.

The next step is to issue the equipment. This process is shown in FIG. 4. After identifying the individual who is receiving equipment, the system calls up that individual's equipment profile. This is a list of all the equipment which needs to be assigned to that individual. An individual can have several equipment profiles depending upon the scheduled activity. For example, the individual can have a practice profile and a game profile. After all of the proper equipment is selected after consulting the individual's profile, the selected equipment is scanned, the equipment status associated with each piece of equipment is changed to assigned, and the equipment is handed over to the individual. Finally, a time and date stamp is associated with the transaction. This updates the equipment profile in the equipment database and updates information on the individual's profile in the individual profile database. In the equipment profile database, the individual's name is associated with each piece of equipment handed out. In the individual profile database, the piece of equipment is associated with an "assigned equipment" list.

The return of equipment is similar to the issue equipment process. This process is shown in FIG. 5. Equipment is returned by the individual, and the identification tags 12 associated with the equipment is scanned. The equipment is physically inspected to determine whether it is broken. If broken, a determination is made to see whether the equipment can be repaired. If repairable, the equipment is inactivated. If not repairable, the equipment is sent to equipment disposal. If the equipment is not broken, the equipment is checked to see if it is an asset. No equipment can become an asset until after an asset-creating event has occurred and has been documented by the system. An asset-creating event can be any event, but in the preferred embodiment, an asset-creating event is a game. If not an asset, the equipment profile database and individual profile database are updated. If it is an asset, a check is made to see if the asset should be retained. If the asset is to be retained the equipment is deactivated and set aside for disposal. If the asset is not to be retained, equipment and individual profiles are updated. The usage of the equipment is then recorded in the system. An example of this would be to indicate the piece of equipment was used in a game.

The equipment program uses a two-step process to designate a piece of equipment an asset. Using the input device the asset flag can be turned on for an equipment group. Indeed, with the desire by collectors and sports fans to possess "authentic" jerseys or equipment, even equipment that is unassigned in inventory can become valuable. All equipment in that group then becomes a potential asset. The next step is to set the asset status in the individual profiles. The default setting in all individual profiles turns the asset flag off when a piece of equipment is assigned to that individual. For a specifically identified individual, the default setting is reversed and the asset flag stays turned on when the equipment is assigned to that individual. Generally, only the team stars would have this asset setting.

The equipment management program creates a history file for each piece of equipment. The history file includes information relating to the assignment and use of the piece of equipment. Such history information may include, but is not limited to, the name of the individual using the equipment, the dates and times of use, the opposing team or opposing player, various records achieved or broken during the use of the equipment, etc. This information is stored in the equipment application server and can be accessed via the Internet using a web browser. Accordingly, a person selling an asset as an article of sports memorabilia may access the history file and demonstrate authenticity as well as the provenance of the item.

The equipment management program also has an order form generation feature. When a piece of equipment is deactivated and disposed of (i.e. broken or sold as an asset) the program may automatically generate a complete order form, or may electronically place an order for replacement equipment using the equipment profile.

The equipment management program also has a post activity update feature. For example, a future Hall of Fame athlete can create a market demand for game-worn equipment. A report is generated detailing every piece of equipment ever assigned to the individual. The results are then filtered by equipment group. The desired results are then deactivated and designated for disposal.

The equipment management system of the present invention provides accountability for every piece of equipment. It should be noted that the invention is drawn to an improved method of using a known system to manage equipment. The above described system is indicative of the type of system the invention is intended to work with, but should not be construed as the only type of system the method works with. The invention is intended to function with any type of equipment management system. The improvement involves the ability to identify or flag a piece of equipment assigned to an asset-creating individual. In the preferred embodiment, an asset-creating individual for a sports team is identified as any player that can create a market for game-used equipment. In most cases this would be a fan favorite player. It is specifically pointed out that the system may also function with athletes participating in non-team, individual sports, such as boxing, tennis, swimming, track and field, etc. A potential asset is defined as any piece of equipment which becomes valuable when used in an asset creating event. In the preferred embodiment potential assets are items like game jerseys, shoes, helmets, boxing gloves, shorts, baseball bats, baseball gloves, shirts, hats, etc.

The improvement is shown in the flowchart of FIG. 6. The invention identifies items meeting the following three criteria: 1) potential assets, 2) assigned to asset creating individuals, 3) used in an asset-creating event. The preferred embodiment above uses a flag to identify an asset. The flag is turned on for all members of an equipment group. The flag is then turned off if the equipment is assigned to a non asset creating individual, but left on when assigned to an asset creating individual. After an asset-creating event has taken place, the system designates an asset for any flagged piece of equipment. It should be noted that any number of other methods could be used to designate an asset, and the invention is intended to encompass those variants. For example the system could flag all equipment assigned to an asset-creating individual and turn the flag off for any piece of equipment not in a designated equipment group. The invention is intended to cover a method of assigning a flag to a piece of equipment designated a potential asset and assigned to an asset-creating individual.

In view of the foregoing, it will be seen that the several advantages of the invention are achieved and attained. The preferred embodiment and alternatives were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. For example, the system and method could be used on the set of a movie or on a political campaign. Thus, the breadth and scope of the present invention should not be limited by any of the above-described exemplary embodiments, but should be defined only in accordance with the following claims appended hereto and their equivalents.

What is claimed is:

1. A method for monitoring inventory items, the method comprising:

sending, for each of a plurality of wireless tag identifiers, a query via an antenna to an associated wireless tag;

verifying that an inventory item corresponding to the wireless tag is present in an area for each of the plurality of wireless tag identifiers when a response is received via the antenna from the wireless tag corresponding to the wireless tag identifiers by storing data associated with the inventory item;

associating each of the inventory items with a different entity;

determining one or more additional inventory items to be checked out to at least one of the entities as a function of a profile of the entity; and changing a status indicator associated with the inventory items to show that the inventory items have been checked out to the entities.

2. The method of claim 1, wherein each query is sent via the antenna to the corresponding wireless tags via a wireless link between the antenna and the wireless tags.

3. The method of claim 1, further comprising:
receiving one of the inventory items after it has been checked out to one of the entities;
determining whether the inventory item corresponding to the wireless tag has been checked out to the one of the entities; and
checking the inventory item back in by changing a status of the inventory item.

4. The method of claim 3, further comprising:
performing a scan operation to determine a presence of a new wireless tag that does not have a corresponding wireless tag identifier in an inventory list; and
updating the inventory list to include the new wireless tag determined to be present during the scan operation.

5. The method of claim 1, wherein a list is accessed from a memory device and further comprising storing data in the list that identifies a location associated with each of the inventory items.

6. The method of claim 5, wherein the list that is accessed from a memory device is a prior list that was generated during a monitoring operation prior to a start of a predetermined inventory event, wherein data identifying the predetermined inventory event is stored in the memory device.

7. The method of claim 1, wherein the query sent to the wireless tags contains a prompt that causes the wireless tags to respond with the wireless tag identifiers.

8. The method of claim 1, wherein a list contains a status indicator corresponding to each of the wireless tag identifiers, the status indicator providing an indication of whether the inventory item associated with the wireless tag that corresponds to the wireless tag identifier has been used in an inventory event.

9. The method of claim 1 further comprising:
receiving the inventory items from the entities after they have been used; and
changing a status indicator associated with the inventory items to show that the inventory items have been checked in from the entities.

10. The method of claim 9, wherein a unique identification code is generated that is a value of one of the wireless tag identifiers that corresponds to one of the wireless tags.

11. A monitoring system for monitoring inventory items, each of which has a corresponding wireless tag with a corresponding wireless tag identifier, comprising:
a transceiver system operable to receive and transmit signals within an area; and
a processor configured to:
send a query via the transceiver system to the wireless tags corresponding to wireless tag identifiers;
receive a verification that the inventory items corresponding to the wireless tags are present in the area after a response is received via the antenna from the wireless tag corresponding to the wireless tag identifier;
associate each of the inventory items with an associated entity;
receive a verification that each of the inventory items has been checked out to the associated entity; and
determine one or more additional items to be checked out to each of the associated entities as a function of a profile.

12. The monitoring system of claim 11, wherein each query is sent via the transceiver system to the corresponding wireless tag via a wireless link between the transceiver system and the wireless tag.

13. The monitoring system of claim 11, wherein each wireless tag is an active RFID tag.

14. The monitoring system of claim 13, wherein the unique identification code is a value of the wireless tag identifier that corresponds to the wireless tag.

15. The monitoring system of claim 11, further comprising a memory device that is operationally coupled to the processor and configured to store a list of the wireless tag identifiers and the associated inventory items.

16. The monitoring system of claim 11, wherein the list is a prior list that was generated during a prior inventory monitoring operation.

17. The monitoring system of claim 11, wherein the query sent to the wireless tag is based on the wireless tag identifier that corresponds to the wireless tag.

18. The monitoring system of claim 11, wherein a list further contains a first status indicator and a second status indicator corresponding to each of the wireless tag identifiers, the first status indicator providing an indication of whether the wireless tag that corresponds to the wireless tag identifier is associated with an entity and the second status indicator providing an indication of whether the wireless tag that corresponds to the wireless tag identifier has been checked out to the entity.

19. The monitoring system of claim 11, wherein the query sent to the wireless tag returns a unique identification code that corresponds to the wireless tag.

20. The monitoring system of claim 11, wherein the processor is further configured to:
perform a scan operation to determine a presence of a new wireless tag that does not have a corresponding wireless tag identifier on a list; and
update the list to include the new wireless tag.

* * * * *